(12) United States Patent
Howie, Jr.

(10) Patent No.: US 6,591,457 B1
(45) Date of Patent: Jul. 15, 2003

(54) MULTI-COMPONENT BUTTON AND A METHOD OF MANUFACTURING IT

(75) Inventor: Robert K. Howie, Jr., Decatur, IL (US)

(73) Assignee: The Grigoleit Company, Decatur, IL (US)

( * ) Notice: Subject to any disclaimer, the term of this patent is extended or adjusted under 35 U.S.C. 154(b) by 224 days.

(21) Appl. No.: 09/590,409

(22) Filed: Jun. 8, 2000

(51) Int. Cl.7 .............................................. A45C 13/22
(52) U.S. Cl. ........................................ 16/441; 264/254
(58) Field of Search .................. 16/441, 433, DIG. 18; 264/254, 275, 279, 279.1; 428/35.7, 195, 159, 161; 40/325; 362/26, 30, 28, 29, 100; 292/347

(56) References Cited

U.S. PATENT DOCUMENTS

| | | | |
|---|---|---|---|
| 2,823,286 A | | 2/1958 | Beck |
| 3,543,329 A | * | 12/1970 | Gulitte et al. |
| 4,152,998 A | | 5/1979 | Taylor |
| 4,318,221 A | | 3/1982 | Van Benthuysen et al. |
| 4,441,230 A | * | 4/1984 | Howie |
| 4,604,786 A | | 8/1986 | Howie, Jr. |
| 5,040,479 A | * | 8/1991 | Thrash ........................ 116/279 |
| 5,245,886 A | * | 9/1993 | Truesdell |
| 5,287,251 A | * | 2/1994 | Kato |
| 5,345,838 A | * | 9/1994 | Howie |
| 5,359,165 A | * | 10/1994 | Leveque et al. ............ 200/317 |
| 5,362,932 A | | 11/1994 | Inagaki et al. |
| 5,399,821 A | | 3/1995 | Inagaki et al. |
| 5,450,653 A | * | 9/1995 | Howie |
| 5,475,192 A | | 12/1995 | Inagaki et al. |
| 5,477,024 A | * | 12/1995 | Share et al. ........... 219/121.69 |
| 5,611,970 A | | 3/1997 | Apollonio et al. |
| 5,613,590 A | | 3/1997 | Inagaki et al. |
| 5,752,759 A | * | 5/1998 | Pizzo .......................... 362/26 |
| 5,828,016 A | | 10/1998 | Grannan et al. |
| 5,845,365 A | * | 12/1998 | Howie |
| 5,942,313 A | * | 8/1999 | Howie |
| 6,003,206 A | * | 12/1999 | Hall et al. ..................... 16/441 |
| 6,242,064 B1 | * | 6/2001 | Howie |
| 6,499,191 B1 | * | 12/2002 | Howie, Jr. ................... 16/441 |

\* cited by examiner

Primary Examiner—Gary Estremsky
Assistant Examiner—Mark Williams
(74) Attorney, Agent, or Firm—Cook, Alex, McFarron, Manzo, Cummings & Mehler, Ltd.

(57) ABSTRACT

A multi-component button and a method of making it. The button includes a plastic core having a top surface with a projection in the shape of an icon upstanding on the top surface. A thin piece of metal is seated on the top surface of the core and receives the icon. A plastic shell engages the outer edges of the thin piece of metal and forms side and end walls around the core. The method includes forming the core, positioning the metal piece on the top of the core and molding a plastic shell around the outer edges of the metal sheet and the side and end walls of the core.

4 Claims, 1 Drawing Sheet

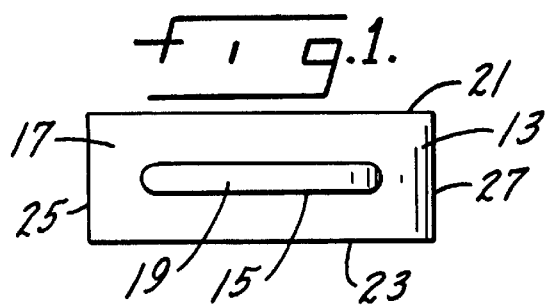
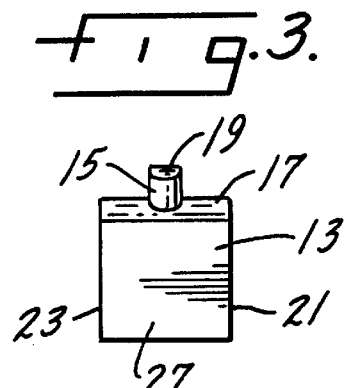
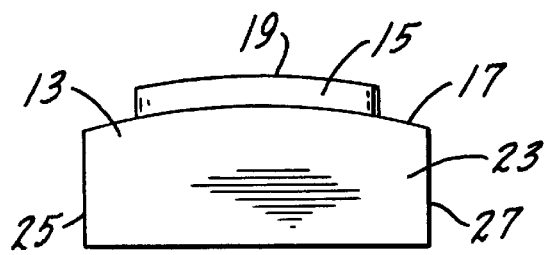
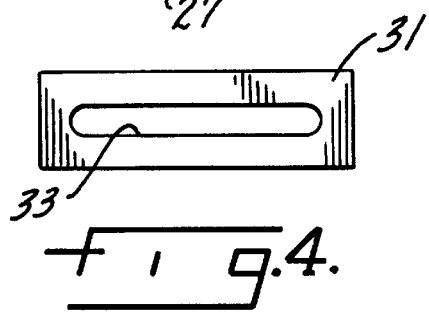
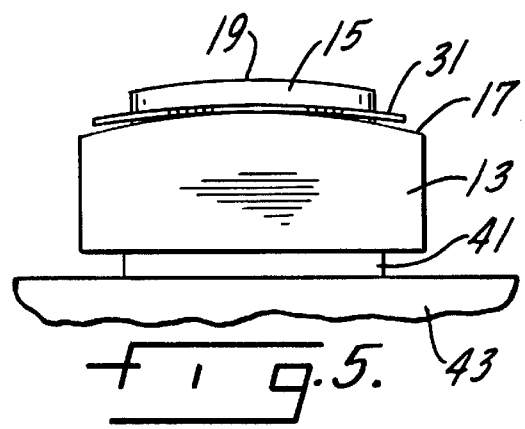
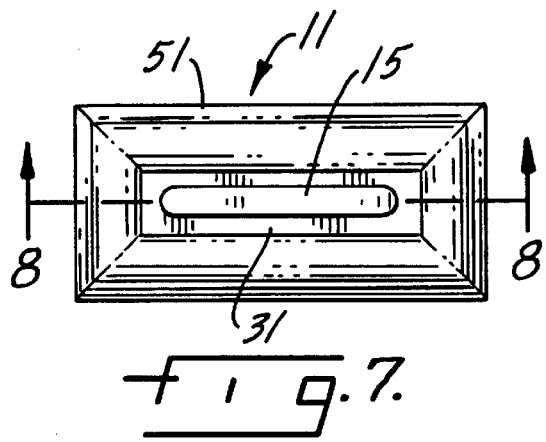
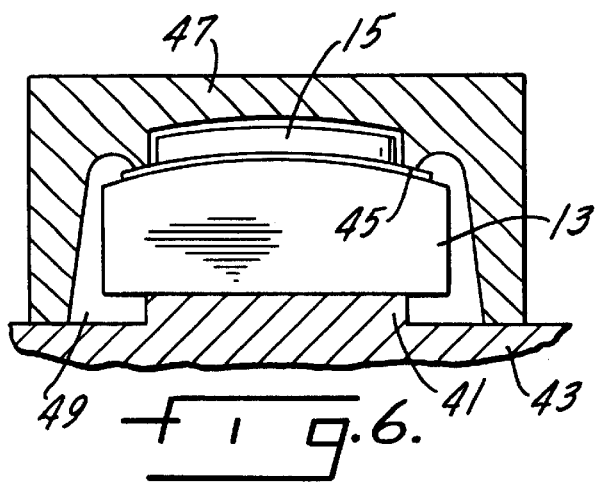
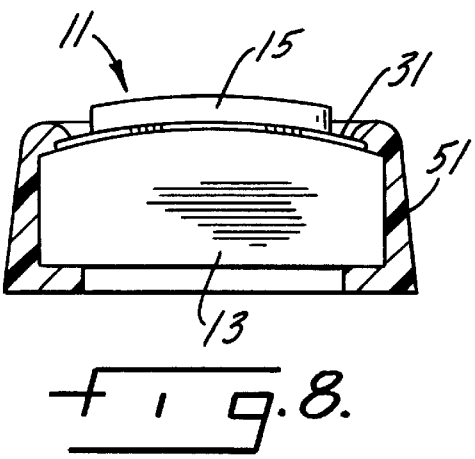

MULTI-COMPONENT BUTTON AND A METHOD OF MANUFACTURING IT

BACKGROUND AND SUMMARY OF THE INVENTION

This invention is directed to a multi-component button and a method for manufacturing the button. By button, I mean a control item such as a knob or a button of the type used in vehicle, machinery, equipment and appliance controls. It is important that such buttons or knobs be both functional and attractive. The functional requirements include strength, durability and ease of manufacture. Such buttons must also be comfortable to the touch of the user and present clearly defined icons indicating the function of the button. By clear definition, it is meant not only clear visible definition but also clear tactile definition. The term "icon" as used in this specification and claims, refers not only to functional representational images of the type commonly used in the computer industry but also includes letters, numerals, indicator lines, trademarks, logos and symbols of all shapes and sizes which may be perceived by the human eye or recognized by touch. In the past, multiple labor intensive operations have been required to produce an icon of sufficiently fine detail and clarity to meet the foregoing requirements.

Accordingly, it is an object of this invention to manufacture a multi-component button using conventional molding and metal forming techniques to produce a durable button having a high clarity icon.

Another object of this invention is a durable button having a high clarity icon which durability is enhanced by the use of a thin metal plate instead of plating to provide an attractive, durable finish highlighting the icon.

Another object of this invention is a method of affixing thin, metal, ornamental plate to a plastic core by molding an outer shell of plastic over peripheral edges of the thin metal plate.

Other objects of the invention may be found in the following specification, claims and drawings.

BRIEF DESCRIPTION OF THE DRAWINGS

The invention is illustrated more or less diagrammatically in the following drawings wherein:

FIG. 1 is a top plan view of the core of the button of this invention;

FIG. 2 is a side elevational view of the core of the button of FIG. 1;

FIG. 3 is an end elevational view of the core of FIG. 1;

FIG. 4 is a top plan view of a thin piece of metal having an elongated slot formed therein;

FIG. 5 is a partial side elevational view of the core with the thin metal plate mounted thereon positioned in a mold prior to the closing of the mold;

FIG. 6 is a cross sectional view of a mold showing the thin metal plate in its assembled position on the core when the mold is closed but prior to molding;

FIG. 7 is a top plan view of the finished button; and

FIG. 8 is a cross sectional view taken along line 8—8 of FIG. 7.

DESCRIPTION OF THE PREFERRED EMBODIMENT

FIG. 7 of the drawings shows the completed multi-component button 11 made in accordance with the teachings of this invention. As is most clearly shown in the cross sectional view of FIG. 8, the button 11 includes a plastic core 13 having a projection 15 in the shape of an icon which is upstanding on the top or front face 17 of the plastic core. As can be seen most clearly in FIGS. 2 and 3 of the drawings, the top face 17 is concave. The plastic core 13 is rectangular in horizontal cross section and the projection 15, which also has a convex top surface or front surface 19, is elongated extending parallel to the side walls 21 and 23 of the core and terminating short of the end walls 25 and 27 of the core.

The projection 15, which functions as an icon in this embodiment of the invention is an indicator line, but it should be understood and appreciated that it may be of any of the icon shapes which have been previously or will be defined herein. The term "icon" is used in the specification and claims and includes not only graphic configurations such as the indicator line shown as projection 15 but also includes letters, numerals, trademarks, logos, symbols and any other typical representation which conveys information to or can be recognized by a user either by sight or by touch. Further, although the core is shown as having a rectangular horizontal cross section, it should be understood and appreciated that the core can be made in any conventional shape such as square, circular, etc.

To add decoration to the button and for durability of the decorative aspects thereof, a thin metal plate 31 shown in top plan view in FIG. 4 of the drawings and in a side view in FIG. 5 of the drawings is provided. This thin metal plate is used instead of the conventional methods of electroplating or painting the front face 17 of the core 13 to provide durability. An elongated passage 33 or cutout is formed through the plate and is sized to closely fit over and receive the projection 15 when the thin plate is positioned on the plastic core as shown in FIG. 5 of the drawings. The advantage of using a thin plate is that it does not necessarily have to be bent to conform exactly to the convex shape of the front face 17 of the core since the thin plate will bend slightly due to its own weight and will be forced into conformity with the convex front face 17 of the plastic core 13 by the mold tooling shown in FIG. 6 in a manner which will be explained hereinafter. The thin metal plate 31 is formed in a rectangular shape to match the rectangular shape of the front face 17 of the core with the thin plate dimensions being established so that it fits inside the side walls 21,23 and end walls 25,27 of the core as can be seen by a comparison of the top views of FIG. 1 of the core and FIG. 4 of the thin metal plate.

After the thin metal plate is positioned on the front face 17 of the plastic core 13 to fit over and receive the projection 15, the core is positioned on a pedestal 41 of the mold plunger 43. An inwardly extending rectangular collar 45 is formed in the mold cavity 47 and this collar engages the outer edges of the thin metal plate 31 as shown in FIG. 6 of the drawings to force the edges of the thin metal plate against the front face 17 of the plastic core 13 when the mold plunger 43 is closed thereby moving the core and the thin metal plate against the edges of the rectangular collar 45 of the mold cavity 47.

When the mold plunger 43 and mold cavity 47 are closed, as shown in FIG. 6, molten plastic can be injected into the void spaces 49 surrounding the side walls 21,23 and end walls 25,27 of the plastic core 13 and around the peripheral edges of its front face 17 and the outer edges of the thin metal plate 31 to form the multi-component button 11 as shown in FIGS. 7 and 8 of the drawings. The injection molded plastic forms plastic shell 51 which holds the thin metal plate 31 to the top surface 17 of the plastic core 13.

What is claimed is:

1. A multi-component button including:

a plastic core having a top surface, a projection in the shape of an icon upstanding on said top surface, a thin piece of metal seated on said top surface of said core, said thin piece of metal having outer edges, a passage extending through said thin piece of metal, said passage shaped to closely receive and allow said projection to extend through said thin piece of metal when said thin piece of metal is seated on said top surface of said core, and a plastic shell engaging the outer edges of said thin piece of metal and having at least side and end walls surrounding said plastic core.

2. The multi-component button of claim 1 in which said top surface of said plastic core is convex and said thin piece of metal conforms to said top surface of said plastic core.

3. A method of making a multi-component button including the steps of:

forming a plastic core having a top surface and a projection in the shape of an icon upstanding on said top surface, forming a thin piece of metal in substantially the same shape as said top surface of said plastic core, forming a passage through said thin piece of metal with said passage having substantially the same shape as said projection, seating said thin piece of metal on said top surface of said plastic core with said passage fitting over and receiving said projection, and molding a plastic shell around at least some portions of said core and some portions of said thin sheet of metal to attach said thin sheet of metal to said top surface of said core.

4. The method of claim 3 in which said plastic core is formed with a convex top surface, said thin piece of metal is formed to be substantially flat and said thin sheet of metal is bent to conform to said convex top surface of said core before said plastic shell is molded around said core.

* * * * *